United States Patent
Song et al.

(10) Patent No.: US 12,056,437 B2
(45) Date of Patent: Aug. 6, 2024

(54) ELECTRONIC DEVICE AND METHOD FOR CONVERTING SENTENCE BASED ON A NEWLY COINED WORD

(71) Applicants: Samsung Electronics Co., Ltd., Suwon-si (KR); KNU-INDUSTRY COOPERATION FOUNDATION, Chuncheon-si (KR)

(72) Inventors: Chiwoo Song, Suwon-si (KR); Honghee Gil, Suwon-si (KR); Saegyeol Lee, Suwon-si (KR); Changki Lee, Chuncheon-si (KR); Youngchan Choi, Suwon-si (KR)

(73) Assignees: Samsung Electronics Co., Ltd., Suwon-si (KR); KNU-INDUSTRY COOPERATION FOUNDATION, Chuncheon-si (KR)

( * ) Notice: Subject to any disclaimer, the term of this patent is extended or adjusted under 35 U.S.C. 154(b) by 492 days.

(21) Appl. No.: 17/309,853

(22) PCT Filed: Jun. 22, 2021

(86) PCT No.: PCT/KR2021/007814
§ 371 (c)(1),
(2) Date: Jun. 23, 2021

(87) PCT Pub. No.: WO2021/261882
PCT Pub. Date: Dec. 30, 2021

(65) Prior Publication Data
US 2022/0004701 A1    Jan. 6, 2022

(30) Foreign Application Priority Data

Jun. 23, 2020 (KR) .................. 10-2020-0076790

(51) Int. Cl.
*G06F 40/166* (2020.01)
*G06F 40/253* (2020.01)
(Continued)

(52) U.S. Cl.
CPC .......... *G06F 40/166* (2020.01); *G06F 40/253* (2020.01); *G06F 40/279* (2020.01); *G06F 40/30* (2020.01); *G06N 20/00* (2019.01)

(58) Field of Classification Search
CPC .... G06F 40/166; G06F 40/253; G06F 40/279; G06F 40/30; G06N 20/00
See application file for complete search history.

(56) References Cited

U.S. PATENT DOCUMENTS

| 10,929,392 B1 * | 2/2021 | Cheng ................... G06N 3/08 |
| 2011/0238411 A1 * | 9/2011 | Suzuki ................ G06F 40/53 704/9 |

(Continued)

FOREIGN PATENT DOCUMENTS

| CN | 111414479 B | * | 3/2023 | ............. G06F 16/35 |
| JP | 2007226793 A |  | 9/2007 | |

(Continued)

OTHER PUBLICATIONS

International Search Report and Written Opinion of the International Searching Authority in connection with International Application No. PCT/KR2021/007814 issued Sep. 24, 2021, 17 pages. (Machine Translation).

(Continued)

*Primary Examiner* — Anne L Thomas-Homescu

(57) ABSTRACT

Provided is an electronic device including a communication module, a memory, and at least one processor operatively connected to the communication module and the memory, and the memory stores instructions configured to, when executed, enable the at least one processor to: receive a first (Continued)

sentence via the communication module; identify a first newly coined word included in the first sentence; obtain a second sentence by identifying a first alternative word corresponding to the first newly coined word, and replacing the first newly coined word in the first sentence with the first alternative word; obtain a third sentence by correcting a grammatical error in the second sentence based on the first alternative word occurring the grammatical error when replacing the first newly coined word; and transmit the third sentence to an external device via the communication module. Other embodiments can be made.

15 Claims, 12 Drawing Sheets

(51) Int. Cl.
  *G06F 40/279* (2020.01)
  *G06F 40/30* (2020.01)
  *G06N 20/00* (2019.01)

(56) References Cited

U.S. PATENT DOCUMENTS

| | | | | |
|---|---|---|---|---|
| 2015/0363384 A1* | 12/2015 | Williams | ................ | G06F 40/30 704/9 |
| 2016/0026617 A1 | 1/2016 | Avner et al. | | |
| 2016/0196342 A1* | 7/2016 | Kim | ................ | G06F 40/247 707/728 |
| 2017/0206891 A1* | 7/2017 | Lev-Tov | ................ | G10L 15/063 |
| 2018/0107654 A1* | 4/2018 | Jung | ................ | G06F 40/247 |
| 2018/0267957 A1* | 9/2018 | Lee | ................ | G06F 40/242 |
| 2021/0149994 A1* | 5/2021 | Kim | ................ | G06N 3/042 |
| 2021/0357599 A1* | 11/2021 | Gupta | ................ | G06F 40/253 |
| 2022/0019737 A1* | 1/2022 | Choi | ................ | G06N 20/00 |
| 2022/0139256 A1* | 5/2022 | Lee | ................ | G10L 15/22 |

FOREIGN PATENT DOCUMENTS

| | | | |
|---|---|---|---|
| KR | 10-1294558 B1 | | 8/2013 |
| KR | 10-2013-0127882 A | | 11/2013 |
| KR | 101551401 B1 | | 9/2015 |
| KR | 10-1664258 B1 | | 10/2016 |
| KR | 101762670 B1 | | 8/2017 |
| KR | 10-1806151 B1 | | 12/2017 |
| KR | 10-2018-0060971 A | | 6/2018 |
| KR | 10-2030551 B1 | | 10/2019 |
| KR | 20200009812 A | * | 1/2020 |

OTHER PUBLICATIONS

Kim et al., "Machine Reading Comprehension-based Question and Answering System for Search and Analysis of Safety Standards", Journal of Korea Multimedia Society vol. 23, No. 2, Feb. 2020, 10 pages.

Cho et al., "Adoption of a Neural Language Model in an Encoder for Encoder-Decoder based Korean Grammatical Error Correction" KIISE Transactions on Computing Practices, vol. 24, No. 6, Feb. 27, 2018, 7 pages.

* cited by examiner

ELECTRONIC DEVICE AND METHOD FOR CONVERTING SENTENCE BASED ON A NEWLY COINED WORD

CROSS-REFERENCE TO RELATED APPLICATIONS

This application is a 371 National Stage of International Application No. PCT/KR2021/007814, filed Jun. 22, 2021, which claims priority to Korean Patent Application No. 10-2020-0076790, filed on Jun. 23, 2020, the disclosures of which are herein incorporated by reference in their entirety.

BACKGROUND

1. Field

The disclosure relates to an electronic device and a method of converting a sentence by an electronic device.

2. Description of Related Art

An artificial intelligence (AI) system is a computer system that implements human-level intelligence, and improves its awareness as a machine performs self-learning, makes decision, and uses itself.

Artificial intelligence technology may include machine learning (deep learning) technology which uses an algorithm that classifies/learns the features of input data itself, and element technologies which mimic functions of a human brain, such as cognition, determination, and the like, using the machine learning algorithm.

The element technologies may include at least one from among linguistic understanding technology that recognizes human languages/characters, visual understanding technology that recognizes objects in a manner in which humans do using vision, deduction/prediction technology that performs logical deduction and prediction by determining information, knowledge expression technology that processes human experience information as knowledge data, and operation control technology that controls autonomous driving of vehicles and movement of robots.

Thanks to the recent remarkable development of information communication technology, semiconductor technology, and the like, artificial intelligence-related technologies can be applied to various types of electronic devices, and thus, the dissemination and usage of electronic devices capable of providing various functions based on artificial intelligence technology is rapidly increasing.

SUMMARY

Artificial intelligence technology according to various embodiments may be applied to various types of electronic devices such as electronic appliances, communication devices, speakers, or the like, and may be used for recognizing voice or text from a user and for providing various types of voice or text recognition-based services to the user.

For example, an electronic device may obtain information by recognizing voice or text from a user based on artificial intelligence technology, and may provide various services, such as an AI secretary service or a translation service, based on the obtained information. For example, a user may input a sentence to an electronic device using voice or text, and the electronic device may recognize the sentence in the form of voice or text, and may provide a service.

The technology that recognizes the sentence provided in the form of voice or text may generally use a word database. As times change, a newly coined word created in order to express something new or an existing word used in a new sense may be frequently used. For example, the usage of newly coined words (or new coinages) is rapidly increasing in various types of media. An electronic device generally uses an existing word database and thus, if the existing word database does not include newly coined words, the electronic device cannot recognize a sentence including a newly coined word.

According to an embodiment, a sentence including a newly coined word is converted into a sentence including a word with a meaning corresponding to the newly coined word and the converted sentence is provided, and thus, an electronic device may be prevented from failing to recognize a newly coined word.

According to an embodiment, there is provided an electronic device including a communication module; a memory; and at least one processor operatively connected to the communication module and the memory, and the memory stores instructions configured to, when executed, enable the at least one processor to receive a first sentence via the communication module; identify a first newly coined word included in the first sentence; obtain a second sentence by identifying a first alternative word corresponding to the first newly coined word, and replacing the first newly coined word in the first sentence with the first alternative word; obtain a third sentence by correcting a grammatical error in the second sentence based on the first alternative word occurring the grammatical error when replacing the first newly coined word; and transmit the third sentence to an external device via the communication module.

According to an embodiment, there is provided an electronic device including an input module; a display; a communication module; a memory; and at least one processor operatively connected to the input module, the display, the communication module, and the memory, and the memory stores instructions configured to, when executed, enable the at least one processor to: obtain a first sentence from a signal input via the input module, and transmit the obtained first sentence to an external device via the communication module; receive, from the external device via the communication module, a third sentence obtained by replacing a first newly coined word in the first sentence with a first alternative word and correcting a grammatical error introduced by replacing the first newly coined word with the first alternative word; and display a result of processing performed in association with the received third sentence on the display.

According to an embodiment, there is provided a newly coined word-based sentence conversion method of an electronic device, the method including receiving a first sentence; identifying a first newly coined word included in the first sentence; obtaining a second sentence by identifying a first alternative word corresponding to the first newly coined word and replacing the first newly coined word in the first sentence with the first alternative word; and obtaining a third sentence by correcting a grammatical error in the second sentence based on the first alternative word occurring the grammatical error when replacing the first newly coined word.

According to an embodiment, there is provided a non-transitory computer-readable recording medium storing instructions which, when executed, cause at least one processor to perform at least one operation including receiving a first sentence; identifying a first newly coined word included in the first sentence; obtaining a second sentence by identifying a first alternative word corresponding to the first newly coined word and replacing the first newly coined word in the first sentence with the first alternative word; and obtaining a third sentence by grammatically correcting an error in the second sentence based on the first alternative word occurring the grammatical error when replacing the first newly coined word.

According to various embodiments, a sentence including a newly coined word is converted into a sentence including a word with a meaning corresponding to the newly coined word and the sentence is provided, and thus, the electronic device can recognize the newly coined word.

According to various embodiments, if a designated application (e.g., an AI agent) is executed in an electronic device, even though the electronic device receives a user utterance including a newly coined word, the electronic device can use a function of converting the newly coined word into an alternative word so that the designated application can provide, to a user, a designated service (e.g., an AI service) corresponding to a voice including the newly coined word.

According to various embodiments, if a translation function of an electronic device is used, a function that converts a newly coined word into an alternative word may also enable the electronic device to translate a sentence including the newly coined word.

The effects of various embodiments are not limited to the above-described effects, and it is apparent to those skilled in the art that various effects are immanent in the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which.

Identical or like reference numerals in the drawings denote identical or like elements.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The terms used in the disclosure are only used to describe specific embodiments, and may not be intended to limit the disclosure. A singular expression may include a plural expression unless they are definitely different in a context.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Figure 1:
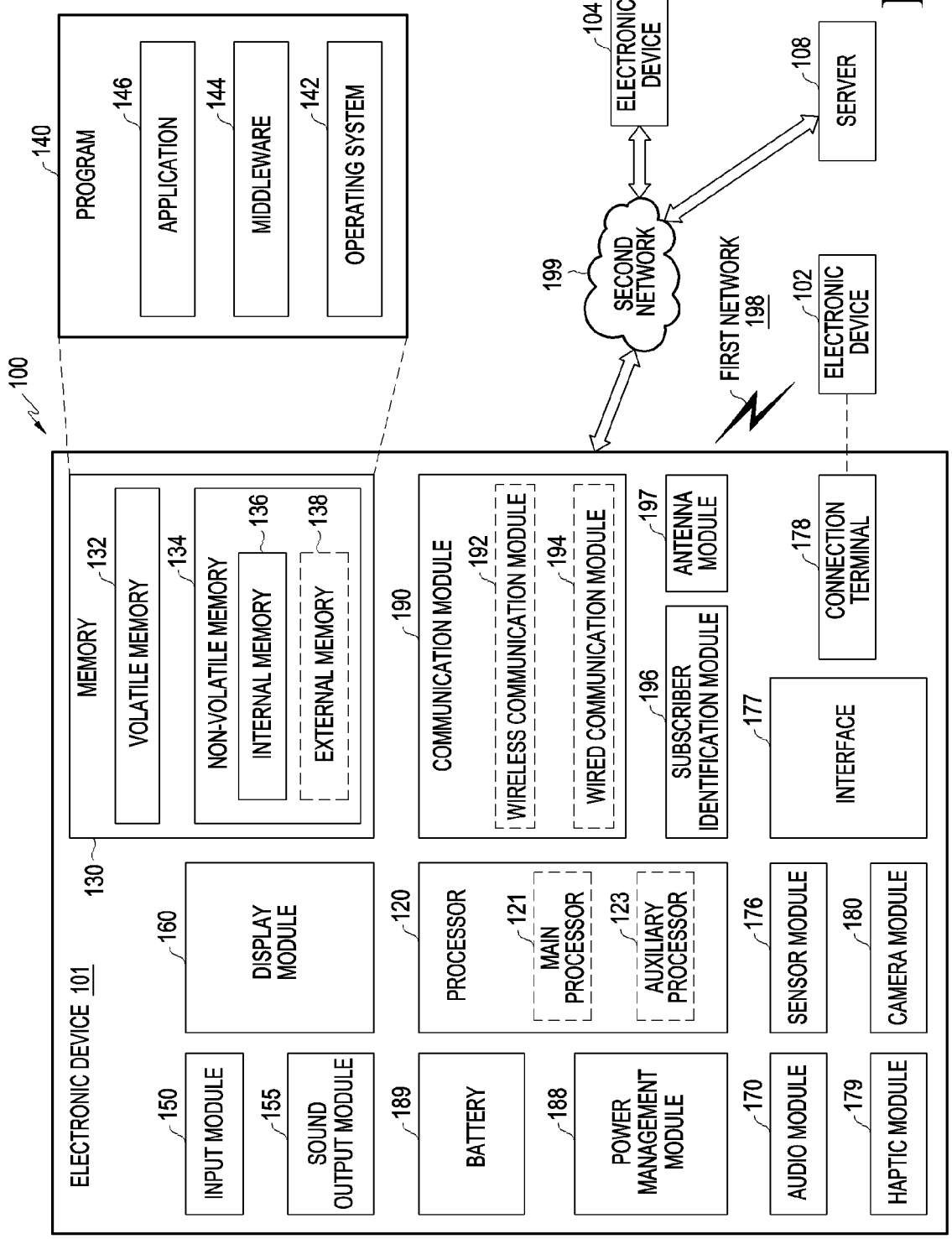
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
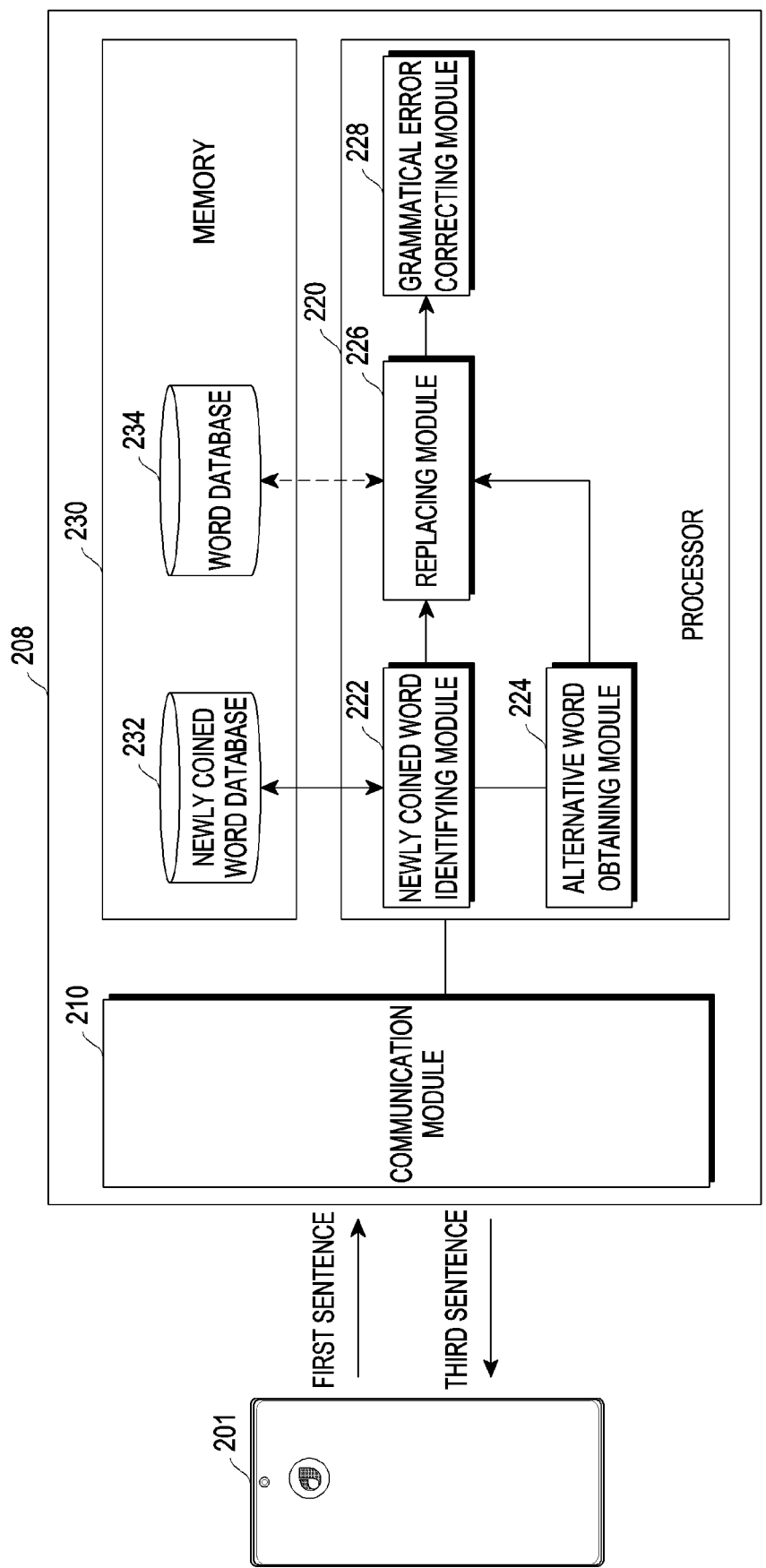
FIG. 2 is a diagram illustrating an electronic device and a server according to an embodiment.

FIG. 2 is a diagram illustrating an electronic device and a server according to an embodiment.

Referring to FIG. 2, an electronic device 201 (e.g., the electronic device 101 of FIG. 1) according to an embodiment may obtain a first sentence from a signal input via an input module (e.g., the input module 150 of FIG. 1), and may transmit the obtained first sentence to the server 208 (e.g., the server 108 of FIG. 1). The server 208 according to an embodiment may replace a first newly coined word included in the first sentence with a first alternative word, and may correct a grammatical error therein. The electronic device 201 according to an embodiment may receive a third sentence including correction from the server 208, and may process the third sentence. For example, the electronic device 201 may display a processing result associated with the third sentence on a display 260 (e.g., the display module 160 of FIG. 1). The first sentence according to an embodiment may include a grammatically correct sentence, or may include a grammatically incorrect sentence. For example, the first sentence may include only one word (e.g., adjective).

The server 208 according to an embodiment may include a communication module 210, a processor 220, and a memory 230. The communication module 210 according to an embodiment may communicate with the electronic device 201. The processor 220 (or at least one processor) according to an embodiment may receive the first sentence from the electronic device 201 via the communication module 210. The processor 220 according to an embodiment may identify the first newly coined word included in the first sentence. The processor 220 according to an embodiment may obtain a second sentence by identifying the first alternative word corresponding to the first newly coined word and replacing the first newly coined word in the first sentence with the first alternative word. The processor 220 according to an embodiment may obtain a third sentence by correcting a grammatical error in the second sentence. The server 208 according to an embodiment may transmit the third sentence to the electronic device 201 via the communication module 210.

According to an embodiment, the processor 220 may include a newly coined word identifying module 222, an alternative word obtaining module 224, a replacing module 226, and/or a grammatical error correcting module 228.

According to an embodiment, the newly coined word identifying module 222 may identify whether at least one newly coined word is included in the first sentence received from the electronic device 201, using a newly coined word database including words corresponding to newly coined words. If the result of identification shows that at least one newly coined word is included, the meaning of the at least one newly coined word (e.g., the first newly coined word) may be identified. In the disclosure, the term "newly coined word" includes a newly coined word itself (e.g., hangry: a newly coined word including the meaning that you become angry since you are hungry), a word that has the same sound as that of an existing word and is newly used as a newly coined word (e.g., savage: a newly coined word meaning of legend), and a sentence that does not include a newly coined word in the sentence but multiple words are used as a newly coined word that includes a new meaning (e.g., Wine O'clock: a newly coined word meaning of a good time for having wine).

According to an embodiment, if at least one newly coined word is included in the first sentence, the newly coined word identifying module 222 may obtain a first vector value by performing vector conversion of the first sentence received from the electronic device 201. The newly coined word identifying module 222 according to an embodiment may identify the meaning of the first sentence by comparing the first vector value with a plurality of vector values obtained by performing vector conversion of a plurality of sentences. According to an embodiment, the plurality of sentences may include representative sentences of sentence groups which are clustered based on meaning. The newly coined word identifying module 222 according to an embodiment may identify the meaning of the first newly coined word based on the identified meaning of the first sentence.

According to an embodiment, the alternative word obtaining module 224 may obtain an alternative word (e.g., the first alternative word) corresponding to the identified meaning of the first newly coined word. According to an embodiment, the alternative word obtaining module 224 may obtain the first alternative word (e.g., "too much") corresponding to the first newly coined word (e.g., "over the top") according to a question and answer scheme using machine reading comprehension. For example, the machine reading comprehension may be technology in which an AI algorithm analyzes a question and finds out the best answer itself. For example, the machine reading comprehension may include an encoder that expresses a question as a vector, a co-attention module that recognizes a relationship based on co-attention, and an output module that outputs the start and the end of an answer in text. For example, the machine reading comprehension may include a Stanford question answering dataset (SQuAD) model.

According to an embodiment, the replacing module 226 may replace the first newly coined word (e.g., "over the top") in the first sentence (e.g., "That is over the top") with the first alternative word (e.g., "too much"). For example, the replacing module 226 may obtain the second sentence (e.g., "That is too much") by replacing the first newly coined word in the first sentence with the first alternative word.

The grammatical error correcting module 228 according to an embodiment may identify whether a grammatical error is included in the second sentence obtained by replacing the first newly coined word in the first sentence with the first alternative word. In various embodiments, the grammatical error may be introduced to the second sentence based on the first alternative word not grammatically fitting in the second sentence, where the first sentence is grammatically correct with the first newly coined word. According to an embodiment, if a grammatical error is included in the second sentence, the grammatical error correcting module 228 according to an embodiment may correct the grammatical error of the second sentence. According to an embodiment, the grammatical error correcting module 228 may learn data pairs including a grammatically erroneous sentence and a grammatically correct sentence using machine learning, may identify whether a grammatical error is included in the second sentence and may correct the grammatical error based on a learning result. According to an embodiment, the machine learning may analyze massive amount of data using an algorithm so as to find out a pattern included therein, and may predict the entire pattern based on the obtained pattern. For example, the grammatical error correcting module 228 may produce a plurality of sets of grammatically erroneous sentences and grammatically correct sentences using a plurality of sets of newly coined words and alternative words, and may learn by performing machine learning of the plurality of sets of grammatically erroneous sentences and grammatically correct sentences, so as to perform grammatical error correction based on learning. According to an embodiment, if it is determined that a grammatical error is not present in the second sentence, the second sentence may be determined as a sentence to be transmitted to an external device (e.g., the electronic device 201). According to an embodiment, the function or operation of determining whether a grammatical error is included in the second sentence, and the function or operation of determining the second sentence as a sentence to be transmitted to the external device (e.g., the electronic device 201) may be performed by at least one other module included in the processor 220.

According to an embodiment, the memory 230 may store instructions and/or data that cause the processor 220 to perform operations. According to an embodiment, the memory 230 may store a newly coined word database 232 including newly coined words and a word database 234 including normal words. For example, the processor 220 according to an embodiment may obtain sentences from at least one designated (or arbitrary) Internet site (e.g., a news site, a community site, or the like), and may identify sentence patterns based on words included in the obtained sentences. If a first sentence pattern among the identified sentence patterns appears at least a predetermined number of times and a word included in the first sentence pattern is not included in the newly coined word database 232, the processor 220 according to an embodiment may store the word included in the first sentence pattern in the newly coined word database 232 as a word corresponding to a newly coined word. According to an embodiment, the word database 234 may store words included in a dictionary.

According to an embodiment, an electronic device (e.g., the server 108 of FIG. 1 or the server 208 of FIG. 2) may include a communication module (e.g., the communication module 210 of FIG. 2), a memory (the memory 230 of FIG. 2), and at least one processor (e.g., the processor 220 of FIG. 2) operatively connected to the communication module and the memory, and the memory stores instructions configured to, when executed, enable the at least one processor to: receive a first sentence via the communication module; identify a first newly coined word included in the first sentence; obtain a second sentence by identifying a first alternative word corresponding to the first newly coined word, and replacing the first newly coined word in the first sentence with the first alternative word; obtain a third sentence by correcting a grammatical error in the second sentence; and transmit the third sentence to an external device via the communication module.

According to an embodiment, the memory may include a newly coined database (e.g., the newly coined word database 232 of FIG. 2) including words corresponding to newly coined words, and the instructions are configured to ,when executed, enable the at least one processor to: identify whether at least one of the words corresponding to newly coined words is present in the first sentence using the newly coined word database; and if at least one of the words corresponding to newly coined words is included in the first sentence, identify the first newly coined word included in the first sentence.

According to an embodiment, the instructions are configured to, when executed, enable the at least one processor to: obtain the words corresponding to newly coined words from at least one designated Internet site; and store the obtained words corresponding to newly coined words in the newly coined word database.

According to an embodiment, the instructions are configured to, when executed, enable the at least one processor to: obtain sentences from the at least one designated Internet site; identify sentence patterns based on words included in the obtained sentences; and if a first sentence pattern appears more than a predetermined number of times among the sentence patterns, and a word included in the first sentence pattern is not included in the newly coined word database, store the word included in the first sentence pattern in the newly coined word database as a word corresponding to a newly coined word.

According to an embodiment, the instructions are configured to, when executed, enable the at least one processor to: obtain a first vector value by performing vector conversion of the first sentence; identify a meaning of the first sentence by comparing the first vector value with a plurality of vector values obtained by performing vector conversion of a plurality of sentences based on meaning; and identify the first newly coined word and a meaning of the first newly coined word based on the identified meaning of the first sentence.

According to an embodiment, the instructions are configured to, when executed, enable the at least one processor to:

obtain a plurality of sentences; cluster the plurality of obtained sentences into groups; obtain a plurality of sentence data sets by tagging a meaning for each of the plurality of clustered sentence groups; and obtain the plurality of vector values by performing vector conversion of each of the plurality of sentence data sets.

According to an embodiment, the instructions are configured to, when executed, enable the at least one processor to identify the first alternative word corresponding to the first newly coined word according to a question and answer scheme using machine reading comprehension.

According to an embodiment, the instructions are configured to, when executed, enable the at least one processor to learn data pairs including a grammatically erroneous sentence and a grammatically correct sentence using machine learning, and to correct a grammatical error in the second sentence based on a learning result.

According to an embodiment, the instructions are configured to, when executed, enable the at least one processor to produce and provide the grammatically erroneous sentence using a newly coined word and an alternative word, and to learn the grammatically correct sentence which is grammatically corrected from the grammatically erroneous sentence.

According to an embodiment, an electronic device (e.g., the electronic device 101 of FIG. 1 or the electronic device 201 of FIG. 2) may include an input module (e.g., the input module 150 of FIG. 1), a display (the display module 160 of FIG. 1), a communication module (e.g., the communication module 190 of FIG. 1), a memory (e.g., the memory 130 of FIG. 1), and at least one processor (e.g., the processor 120 of FIG. 1) operatively connected to the input module, the display, the communication module, and the memory, and the memory stores instructions configured to, when executed, enable the at least one processor to: obtain a first sentence from a signal input via the input module, and transmit the obtained first sentence to an external device via the communication module; receive, from the external device via the communication module, a third sentence obtained by replacing a first newly coined word in the first sentence with a first alternative word and correcting a grammatical error; and display a result of processing performed in association with the received third sentence on the display.

According to an embodiment, the input module includes a microphone, and the instructions are configured to, when executed, enable the at least one processor to convert a voice signal received via the microphone into text, and to obtain the first sentence.

According to an embodiment, the input module includes a touch screen, and the instructions are configured to, when executed, enable the at least one processor to obtain the first sentence based on a touch input signal received via the touch screen.

According to an embodiment, the instructions are configured to, when executed, enable the at least one processor to: obtain the first sentence after executing an application; and perform a function of the application based on the received third sentence.

According to an embodiment, the application is one of an AI agent application, a translation application, or a chatting application.

Figure 3:
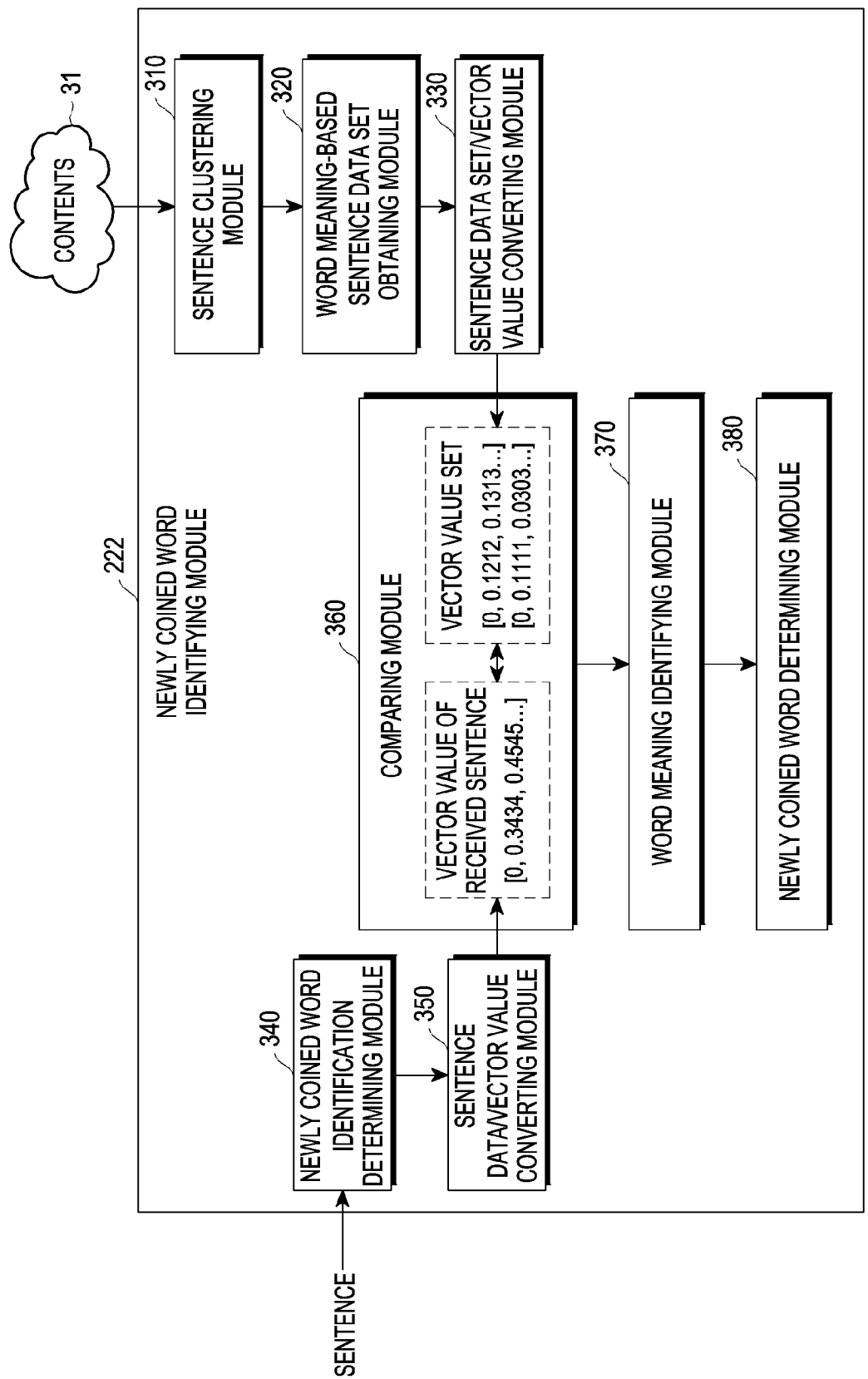
FIG. 3 is a diagram illustrating an example of a newly coined word identifying module according to an embodiment.

FIG. 3 is a diagram illustrating an example of a newly coined word identifying module according to an embodiment.

Referring to FIG. 3, the newly coined word identifying module 222 according to an embodiment may include some or all of a sentence clustering module 310, a word meaning-based sentence data set obtaining module 320, a sentence data set/vector value set converting module 330, a newly coined word identification determining module 340, a sentence data/vector value converting module 350, a comparing module 360, a word meaning identifying module 370, and a newly coined word determining module 380.

According to an embodiment, the sentence clustering module 310 may obtain sentences from contents on a network. The sentence clustering module 310 according to an embodiment may identify patterns of the obtained sentences (e.g., the patterns of words included therein), and cluster sentences into groups based on similarity in patterns, so as to obtain a plurality of sentence groups. According to an embodiment, the obtained sentences may be sentences to which meaning is not assigned. For example, the sentences to which meaning is not assigned may be sentences obtained from contents on a designated (or arbitrary) Internet site. For example, an Internet site may be a news site, a community site, or the like.

According to an embodiment, the word meaning-based sentence data set obtaining module 320 may analyze words included in the plurality of obtained sentence groups, and may tag (assign) a corresponding word meaning for each of the plurality of sentence groups. The word meaning-based sentence data set obtaining module 320 according to an embodiment may obtain a plurality of representative sentences respectively corresponding to the plurality of sentence groups, and may obtain a plurality of sentence data sets to which word meanings are tagged based on a plurality of representative sentences.

The sentence data set/vector value set converting module 330 may convert a sentence data set to which a word meaning is tagged into a vector value set.

The newly coined word identification determining module 340 may identify whether a word which is included in (registered with) the newly coined word database 232 is present in a sentence when the sentence (e.g., a sentence to which identification of a newly coined word is to be performed or the first sentence) is received. If a word included in the newly coined word database is present in the first sentence, the newly coined word identification determining module 340 may determine that identifying of a newly coined word is needed or may start identifying of a newly coined word in association with the first sentence.

According to an embodiment, the sentence data/vector value converting module 350 may convert the first sentence into a first vector value.

According to an embodiment, the comparing module 360 may compare a vector value set and the first vector value associated with the first sentence, so as to obtain a second vector value which is most similar to the first vector value in the vector value set. For example, the comparing module 360 may compare the first vector value and the vector value set using a comparison equation, and may obtain the second vector value which is most similar to (or has the smallest difference from) the first vector value in the vector value set.

For example, the comparison equation may include a cosine distance equation. The cosine distance equation may be Equation 1 below.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}} \quad \text{Equation 1}$$

According to Equation 1, A denotes a first vector value associated with a first sentence (e.g., sentence X), and B denotes a vector value (e.g., a second vector value) associated with any one (e.g., sentence Y) of a plurality of representative sentences. Similarity denotes similarity between A and B. $A_i$ may be an $i^{th}$ element of vector A. $B_i$ may be an ith element of vector B. Each of vector A and vector B may have n elements. For example, similarity may be a value in the range of −1 to 1. As a value is closer to 1, the similarity between a corresponding sentence and the first sentence is higher. For example, the word meaning identifying module 370 may identify a representative sentence that has a second vector value having the highest similarity among the plurality of representative sentences.

According to an embodiment, the word meaning identifying module 370 may identify a sentence group corresponding to the representative sentence corresponding to the second vector value, may identify a word meaning tagged to the sentence group, and may identify the word meaning of the first sentence using the identified word meaning.

According to an embodiment, the newly coined word determining module 380 may identify whether a newly coined word is included in the first sentence based on whether the word meaning of the first sentence corresponds to the meaning of a word included in the newly coined word database 232, and if a newly coined word is included, may identify the meaning of the newly coined word.

Figure 4:
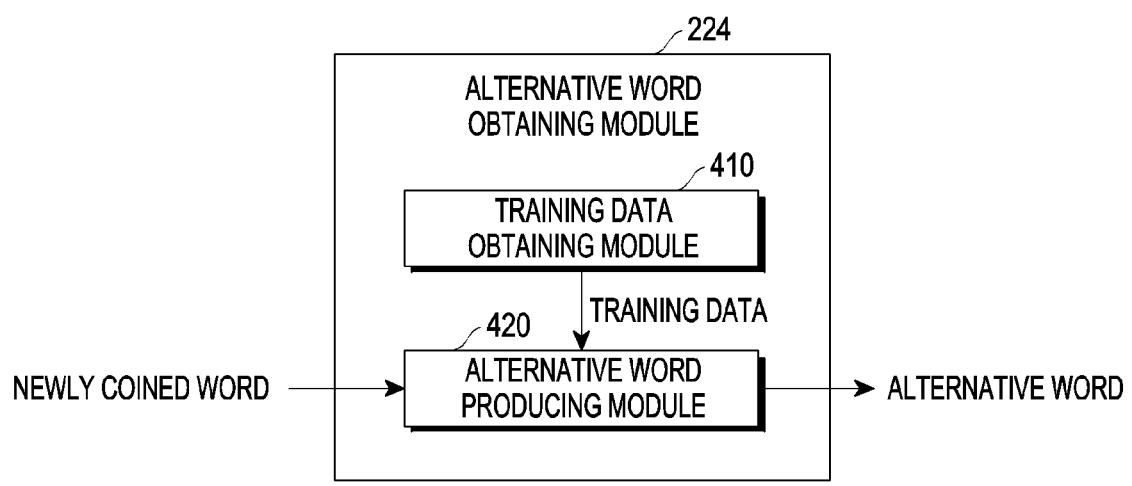
FIG. 4 is a diagram illustrating an example of an alternative word obtaining module according to an embodiment.

FIG. 4 is a diagram illustrating an example of an alternative word obtaining module according to an embodiment.

Referring to FIG. 4, the alternative word obtaining module 224 according to an embodiment may include a train data obtaining module 410 and an alternative word producing module 420.

Using a phenomenon in which a question that asks the meaning of a newly coined word and an answer to the question are up on a web when the newly coined word comes into use, the train data obtaining module 410 according to an embodiment may perform crawling of data using a predetermined newly coined word as a keyword and may obtain the crawled data as train data. For example, crawling may be technology that collects documents that are stored distributively in multiple computers, and may include the documents as indices of subjects to be retrieved.

The alternative word producing module 420 according to an embodiment may produce an alternative word for a newly coined word from train data according to a question and answer scheme using a machine reading comprehension (MRC) deep learning model, and may provide the produced alternative word.

Figure 5:
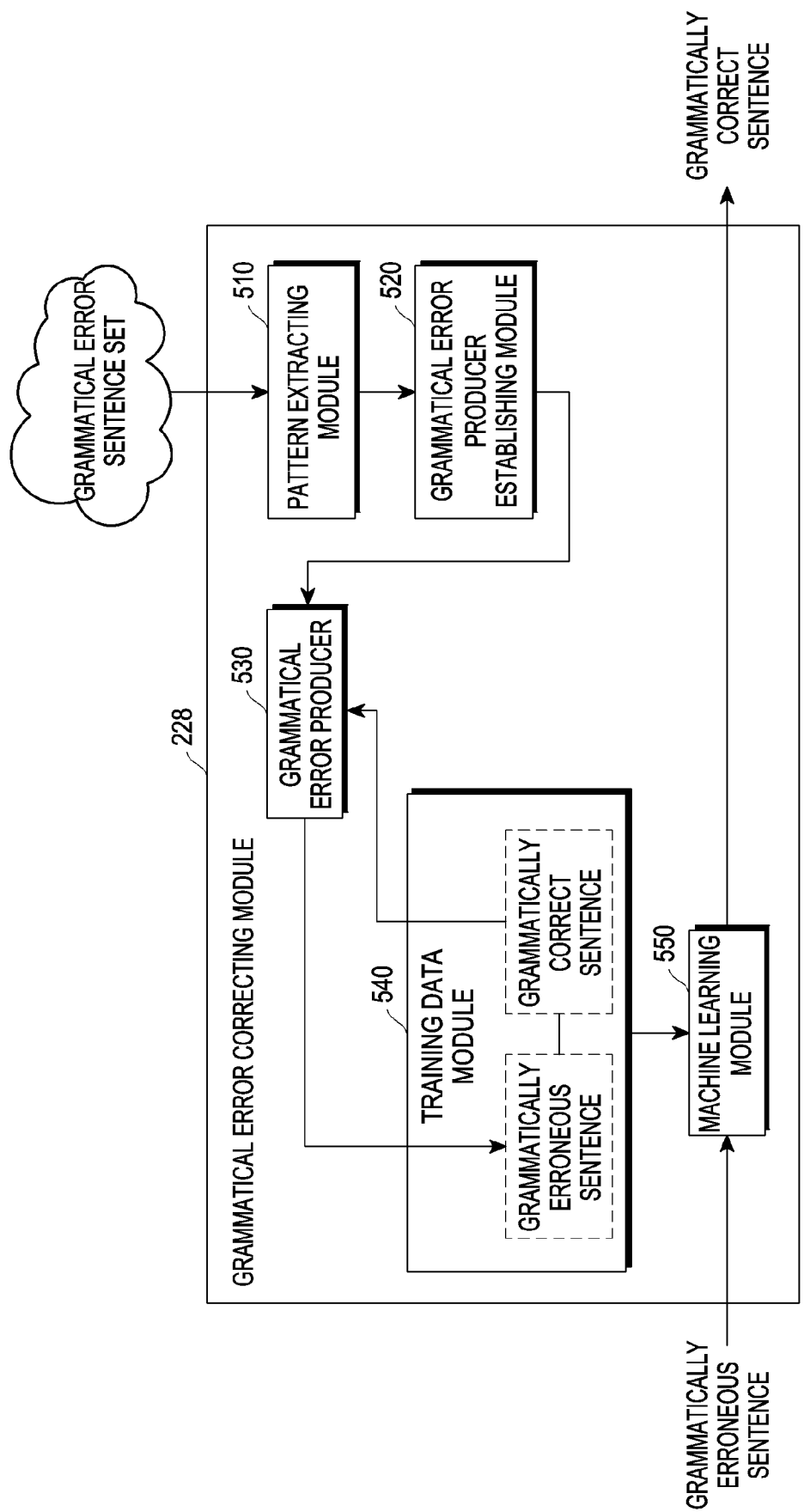
FIG. 5 is a diagram illustrating an example of a grammatical error correcting module according to an embodiment.

FIG. 5 is a diagram illustrating an example of a grammatical error correcting module according to an embodiment.

Referring to FIG. 5, the grammatical error correcting module 228 according to an embodiment may include a pattern extracting module 510, a grammatical error producer establishing module 520, a grammatical error producer 530, a train data module 540, a machine learning module 550.

The pattern extracting module 510 according to an embodiment may extract a plurality of error patterns (e.g., 22 error patterns) from a set of sentences including grammatical errors.

The grammatical error producer establishing module 520 according to an embodiment may establish a grammatical error producer based on the extracted error patterns.

The grammatically error producer 530 according to an embodiment may produce and provide a grammatical erroneous sentence based on a grammatically correct sentence and a plurality of error patterns.

The train data module 540 according to an embodiment may provide a set of grammatically correct sentences and grammatically erroneous sentences for learning.

The machine learning module 550 according to an embodiment may learn the set of grammatically correct sentences and grammatically erroneous sentences for learning from the train data module 540. The machine learning module 550 according to an embodiment may identify whether an input sentence is a sentence having a grammatical error, based on information provided from at least one other module (e.g., the grammatical error producer 530 or the train data module 540). If a grammatically erroneous sentence is input, the machine learning module 550 according to an embodiment may correct the grammatically erroneous sentence to a grammatically correct sentence based on a learning result, and may output the corrected sentence.

Figure 6:
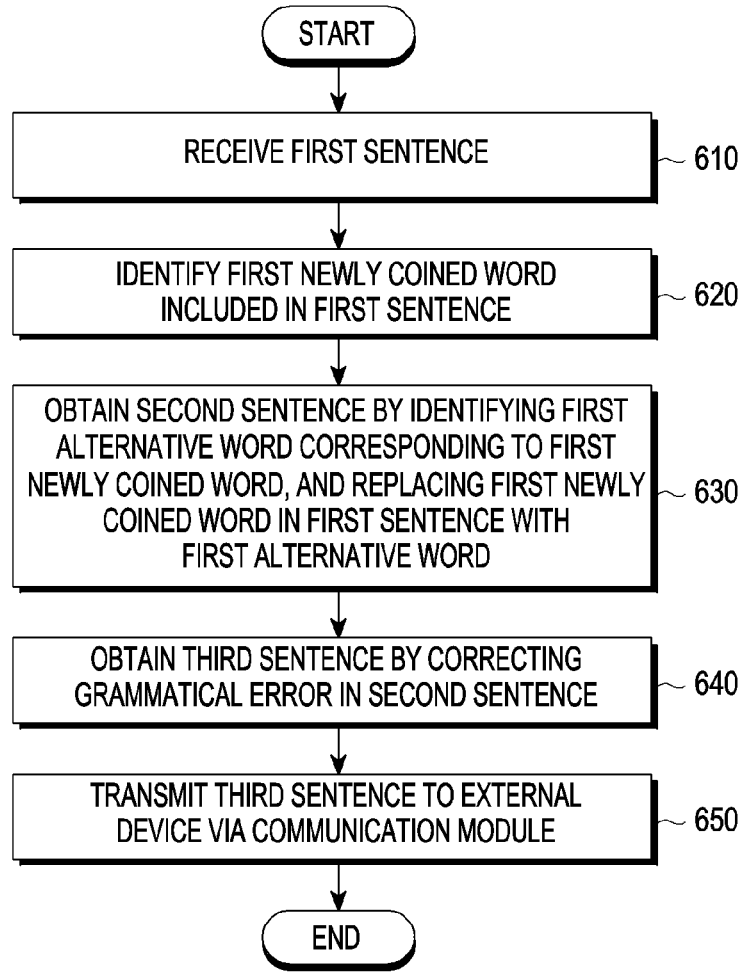
FIG. 6 is a flowchart illustrating newly coined word-based sentence conversion in an electronic device according to an embodiment.

FIG. 6 is a flowchart illustrating newly coined word-based sentence conversion performed by an electronic device according to an embodiment.

Referring to FIG. 6, a processor (e.g., the processor 220 of FIG. 2) of an electronic device (e.g., the server 108 of FIG. 1 or the server 208 of FIG. 2) according to an embodiment may perform at least one operation among operations 610 to 650.

In operation 610, the processor 220 according to an embodiment may receive a first sentence from an external device (e.g., the electronic device 101 of FIG. 1 or the electronic device 201 of FIG. 2).

In operation 620, the processor 220 according to an embodiment may identify at least one first newly coined word (e.g., hangry) that is present in the first sentence (e.g., I am hangry). For example, the processor 220 according to an embodiment may identify whether a word which is included in a newly coined word database is present in the first sentence. According to an embodiment, if a word which is included in (or registered with) the newly coined word database (e.g., the newly coined word database 232 of FIG. 2) is present in the first sentence, the processor 220 may determine that identifying of a newly coined word associated with the first sentence is needed, and may start identifying a newly coined word. According to an embodiment, in order to identify a newly coined word, the processor 220 may convert the first sentence into a first vector value, may compare the first vector value with a vector value set associated with a plurality of representative sentences which are obtained in advance based on word meaning, and may obtain a second vector value which is most similar to the first vector value from the vector value set. According to an embodiment, the processor 220 may identify a sentence group corresponding to a representative sentence that corresponds to the second vector value, may identify a word meaning tagged to the sentence group, and may identify the word meaning of the first sentence using the identified word meaning. According to an embodiment, the processor 220 may identify the first newly coined word included in the first sentence based on whether the word meaning of the first sentence corresponds to the meaning of a word included in the newly coined word database 232, and may identify the meaning of the first newly coined word.

In operation 630, the processor 220 according to an embodiment may obtain a second sentence (e.g., I am hungry and angry) by identifying at least one first alternative word (e.g., hungry and angry) corresponding to the identified first newly coined word, and replacing the first newly coined word in the first sentence with the first alternative word. The processor 220 according to an embodiment may produce the first alternative word for the first newly coined word from train data according to a question and answer scheme using a machine reading comprehension (MRC) deep learning model, and may replace the first newly coined word with the produced first alternative word.

In operation 640, if grammatical error correction is needed, the processor 220 according to an embodiment may correct a grammatical error in the second sentence and may obtain a third sentence. The processor 220 according to an embodiment may learn data pairs including a grammatically erroneous sentence and a grammatically correct sentence using machine learning, and may correct a grammatically error in the second sentence based on a learning result, thereby obtaining the third sentence. According to an embodiment, an operation of determining whether the second sentence needs grammatical error correction may be further included between operations 630 and 640.

In operation 650, the processor 220 according to an embodiment may transmit the obtained third sentence to the external device (e.g., the electronic device 101 of FIG. 1 or the electronic device 201 of FIG. 2) via a communication module. According to an embodiment, if it is determined that the second sentence does not need grammatical error correction, the processor 220 may transmit the second sentence to the external device (e.g., the electronic device 101 of FIG. 1 or the electronic device 201 of FIG. 2) via the communication module in operation 650.

According to various embodiments, operations 610 to 650 may be performed by the electronic device (e.g., the electronic device 101 of FIG. 1 or the electronic device 201 of FIG. 2).

Figure 7:
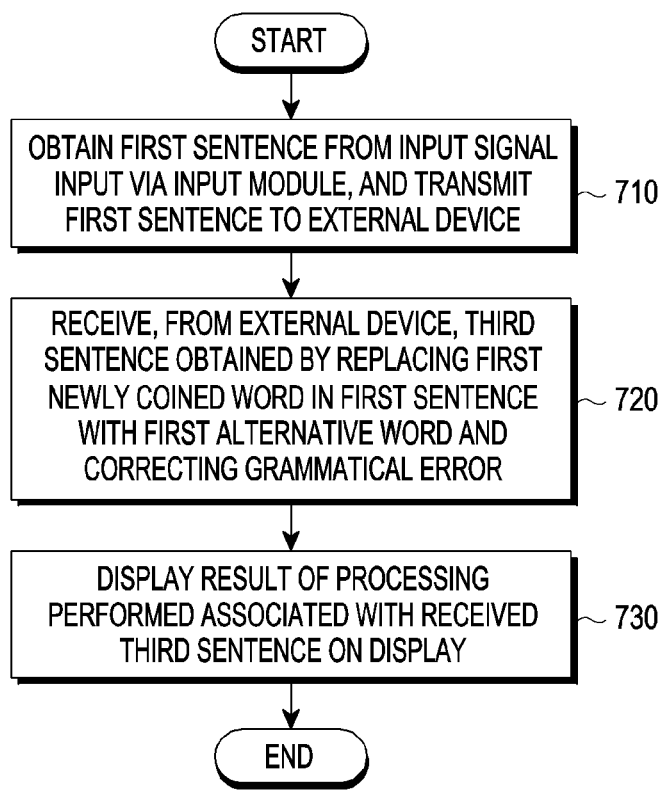
FIG. 7 is a flowchart illustrating the operation of a display using newly coined word-based sentence conversion in an electronic device according to an embodiment.

FIG. 7 is a flowchart illustrating the operation of a display using newly coined word-based sentence conversion in an electronic device according to an embodiment.

Referring to FIG. 7, a processor (e.g., the processor 120 of FIG. 1) of an electronic device (e.g., the electronic device 101 of FIG. 1 or the electronic device 201 of FIG. 2) according to an embodiment may perform at least one operation among operations 710 to 730.

In operation 710, the processor 120 according to an embodiment may obtain a first sentence from an input signal input via an input module (e.g., the input module 150 of FIG. 1) of the electronic device 101, and may transmit the same to an external device (e.g., the server 108 of FIG. 1 or the server 208 of FIG. 2) via a communication module (e.g., the communication module 190 of FIG. 1). For example, the input module may include a microphone, and the processor 120 may convert a voice signal received via the microphone into text, and may obtain the first sentence. As another example, the input module may include a touch screen, and the processor 120 may obtain the first sentence based on a touch input signal received via the touch screen.

In operation 720, the processor 120 according to an embodiment may receive a third sentence obtained by replacing a first newly coined word in the first sentence with a first alternative word and correcting a grammatical error or a sentence including the first alternative word, from an external device (e.g., the server 108 of FIG. 1 or the server 208 of FIG. 2) via the communication module 190. According to another embodiment, unlike operations 710 and 720, the processor 120 may obtain the first sentence from the input signal input via the input module (e.g., the input module 150 of FIG. 1) and autonomously replace the first newly coined word in the first sentence with the first alternative word, and may correct a grammatical error, so as to obtain the third sentence.

In operation 730, the processor 120 according to an embodiment may display, on the display (e.g., the display module 160 of FIG. 1), a result of processing performed in association with the received third sentence or the received sentence including the first alternative word.

The newly coined word-based sentence conversion method in the electronic device (e.g., the server 108 of FIG. 1 or the server 208 of FIG. 2) according to various embodiments may include: an operation of receiving a first sentence; an operation of identifying a first newly coined word that is present in the first sentence; an operation of obtaining a second sentence by identifying a first alternative word corresponding to the first newly coined word and replacing the first newly coined word in the first sentence with the first alternative word; and an operation of obtaining a third sentence by correcting a grammatical error in the second sentence.

The newly coined word-based sentence conversion method in the electronic device (e.g., the server 108 of FIG. 1 or the server 208 of FIG. 2) according to various embodiments may include: an operation of receiving a first sentence; an operation of identifying a first newly coined word that is present in the first sentence; an operation of obtaining a second sentence by identifying a first alternative word corresponding to the first newly coined word and replacing the first newly coined word in the first sentence with the first alternative word; an operation of determining whether the second sentence needs grammatical error correction; and an operation of determining the second sentence as a sentence to be transmitted to an external device if the second sentence does not need grammatical error correction.

The method according to various embodiments may include: an operation of obtaining words corresponding to newly coined words from at least one designated Internet site and storing the same in a newly coined word database; an operation of identifying whether at least one word in the first sentence is present in the words corresponding to newly coined words using the newly coined word database; and an operation of identifying a first newly coined word included in the first sentence if at least one of the words corresponding to newly coined words is present in the first sentence.

The method according to various embodiments may include: an operation of obtaining a first vector value by performing vector conversion of the first sentence; an operation of identifying the meaning of the first sentence by comparing the first vector value with a plurality of vector values obtained by vector conversion of a plurality of sentences based on meaning; and an operation of identifying the first newly coined word and the meaning of the first newly coined word based on the identified meaning of the first sentence.

The method according to various embodiments may include: an operation of obtaining a plurality of sentences; an operation of clustering the plurality of obtained sentences into groups; an operation of obtaining a plurality of sentence data sets by tagging a meaning for each of the plurality of clustered sentence groups; and an operation of obtaining the plurality of vector values by performing vector conversion of each of the plurality of sentence data sets.

The method according to various embodiments may identify the first alternative word corresponding to the first newly coined word according to a question and answer scheme using machine reading comprehension.

The method according to various embodiments may learn data pairs including a grammatical erroneous sentence and a grammatical correct sentence using machine learning, and may correct a grammatical error in the second sentence based on a learning result.

Figure 8:
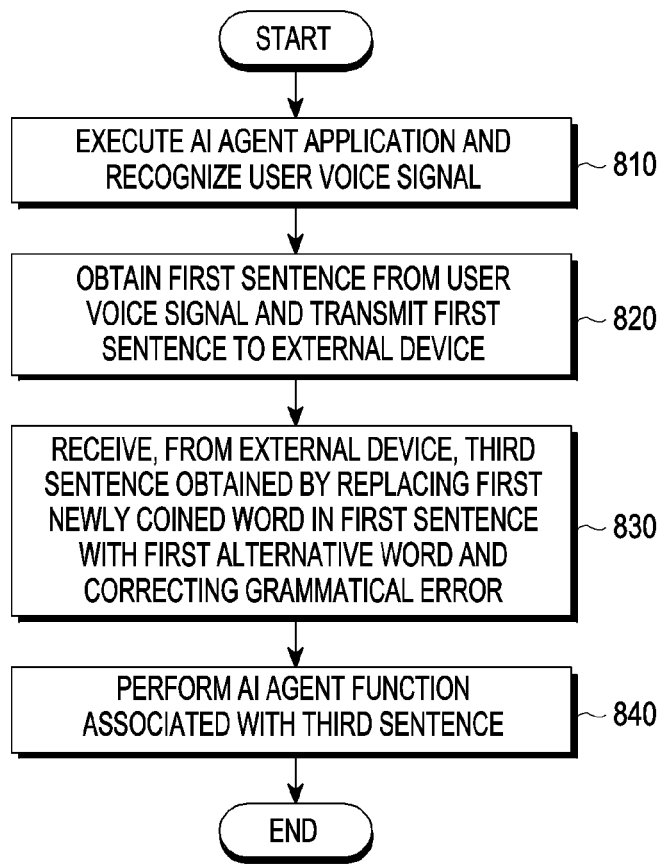
FIG. 8 is a flowchart illustrating the operation of an AI agent function using newly coined word-based sentence conversion in an electronic device according to an embodiment.

FIG. 8 is a flowchart illustrating the operation of an AI agent function using newly coined word-based sentence conversion in an electronic device according to an embodiment.

Referring to FIG. 8, a processor (e.g., the processor 120 of FIG. 1) of an electronic device (e.g., the electronic device 101 of FIG. 1 or the electronic device 201 of FIG. 2) according to an embodiment may perform at least one operation among operations 810 to 840.

In operation 810, the processor 120 according to an embodiment may execute an AI agent application so as to recognize a user voice signal. For example, the AI agent application may be an AI secretary service. For example, a user may execute the AI agent application using a wakeup voice command (e.g., "Hi! Bixbi").

In operation 820, the processor 120 according to an embodiment may obtain a first sentence from the user voice signal and may transmit the sentence to an external device (e.g., the server 108 of FIG. 1 or the server 208 of FIG. 2). For example, the processor 120 may convert a user voice signal received via a microphone into text, and may obtain the first sentence.

In operation 830, the processor 120 according to an embodiment may receive a third sentence obtained by replacing at least one first newly coined word in the first sentence with at least one first alternative word and correcting a grammatical error, from the external device (e.g., the server 108 of FIG. 1 or the server 208 of FIG. 2) via the communication module 190. According to another embodiment, unlike operations 820 and 830, the processor 120 may obtain the first sentence from the input signal input via the input module (e.g., the input module 150 of FIG. 1) and may autonomously replace the first newly coined word in the first sentence with the first alternative word, and may correct a grammatical error, so as to obtain the third sentence.

In operation 840, the processor 120 according to an embodiment may perform an AI agent application function associated with the received third sentence.

Figure 9:
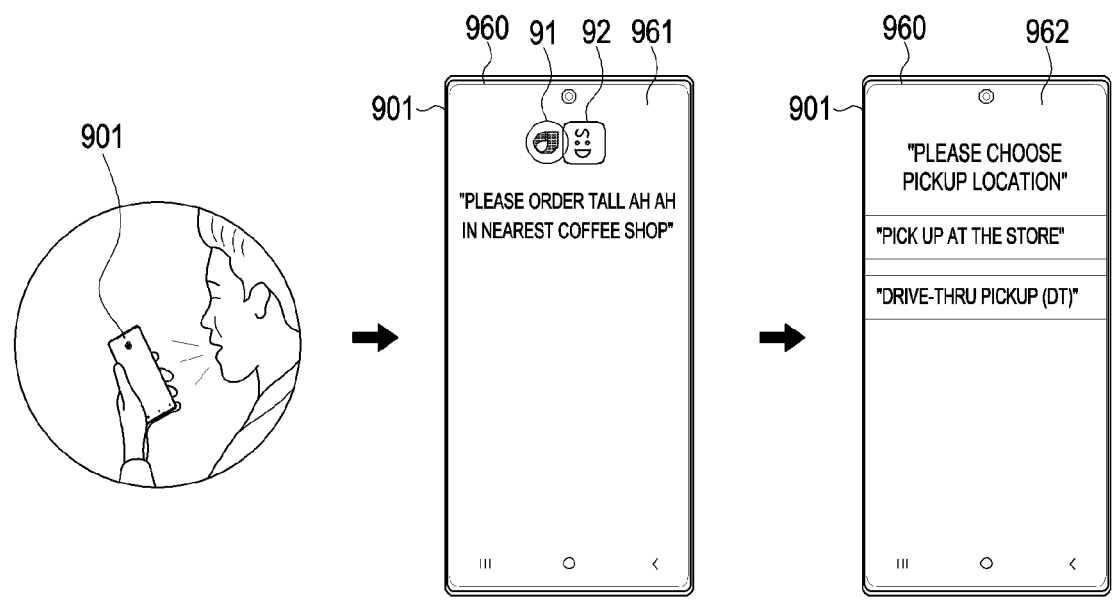
FIG. 9 is a diagram illustrating the operation of an AI agent function using newly coined word-based sentence conversion in an electronic device according to an embodiment.

FIG. 9 is a diagram illustrating the operation of an AI agent function using newly coined word-based sentence conversion in an electronic device according to an embodiment.

Referring to FIG. 9, an electronic device 901 according to an embodiment (e.g., the electronic device 101 of FIG. 1 or the electronic device 201 of FIG. 2) may receive a voice signal, such as "Please order tall Ah Ah in the nearest coffee shop.") from a user in the state in which an AI agent application is executed.

According to an embodiment, the electronic device 901 may recognize a voice signal and may obtain a first sentence in the form of text, and may transmit the first sentence to an external device (e.g., the server 108 of FIG. 1 or the server 208 of FIG. 2), and simultaneously, may display the first sentence on a display 960. For example, the display 960 may display an AI agent application screen 961, and the first sentence may be displayed on the AI agent application screen 961 together with a first icon 91 indicating that the AI agent application is being executed and a second icon 92 indicating that a newly coined word-based conversion is being performed on the first sentence.

According to an embodiment, if "Please order tall iced Americano in the nearest coffee shop" is received as a third sentence in which the first newly coined word(e.g., Ah Ah) that is present in the first sentence is replaced with a first alternative word(e.g., iced Americano) and a grammatical error is corrected, the electronic device 901 may execute an ordering application for ordering tall iced Americano in the nearest coffee shop via the AI agent application, and may display an ordering application screen 962 on the display 960.

According to various embodiments, if the AI agent function is used in the electronic device, the AI agent may provide an AI service corresponding to a voice including a newly coined word using a function of converting the newly coined word into an alternative word even though a user utters a voice including the newly coined word.

Figure 10:
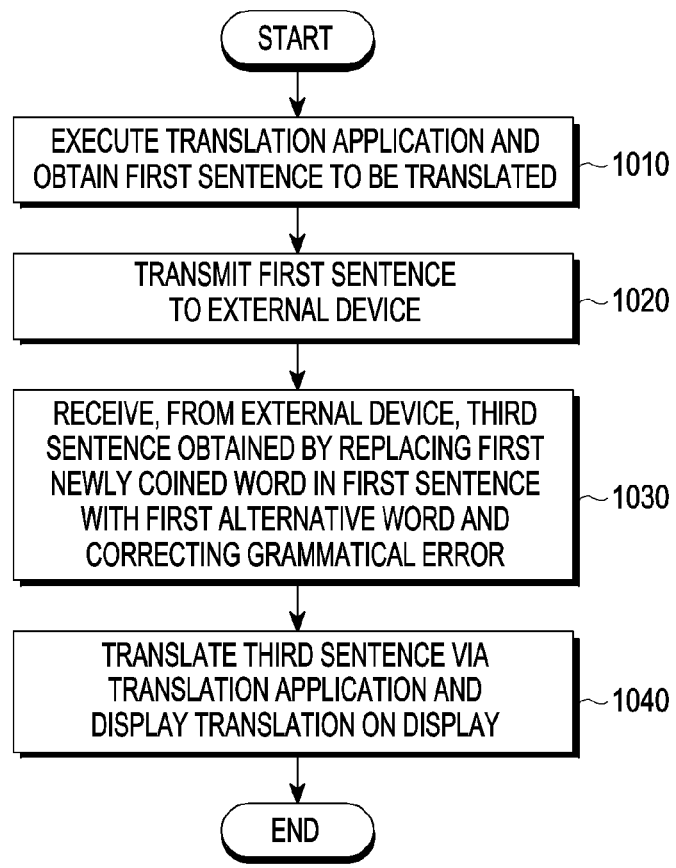
FIG. 10 is a flowchart illustrating the operation of a translation function using newly coined word-based sentence conversion in an electronic device according to an embodiment.

FIG. 10 is a flowchart illustrating the operation of a translation function using newly coined word-based sentence conversion in an electronic device according to an embodiment.

Referring to FIG. 10, a processor (e.g., the processor 120 of FIG. 1) of an electronic device (e.g., the electronic device 101 of FIG. 1 or the electronic device 201 of FIG. 2) according to an embodiment may perform at least one operation among operations 1010 to 1040.

In operation 1010, the processor 120 according to an embodiment may execute a translation application, and may obtain a first sentence which is to be translated.

In operation 1020, the processor 120 according to an embodiment may transmit the first sentence to an external device (e.g., the server 108 of FIG. 1 or the server 208 of FIG. 2).

In operation 1030, the processor 120 according to an embodiment may receive a third sentence obtained by replacing a first newly coined word in the first sentence with a first alternative word and correcting a grammatical error, from the external device (e.g., the server 108 of FIG. 1 or the server 208 of FIG. 2) via the communication module 190. According to another embodiment, unlike operations 1020 and 1030, the processor 120 may autonomously replace the first newly coined word included in the first sentence with the first alternative word, and may correct a grammatical error, so as to obtain the third sentence.

In operation 1040, the processor 120 according to an embodiment may translate the third sentence using the translation application, and may display the translated sentence on the display.

Figure 11:
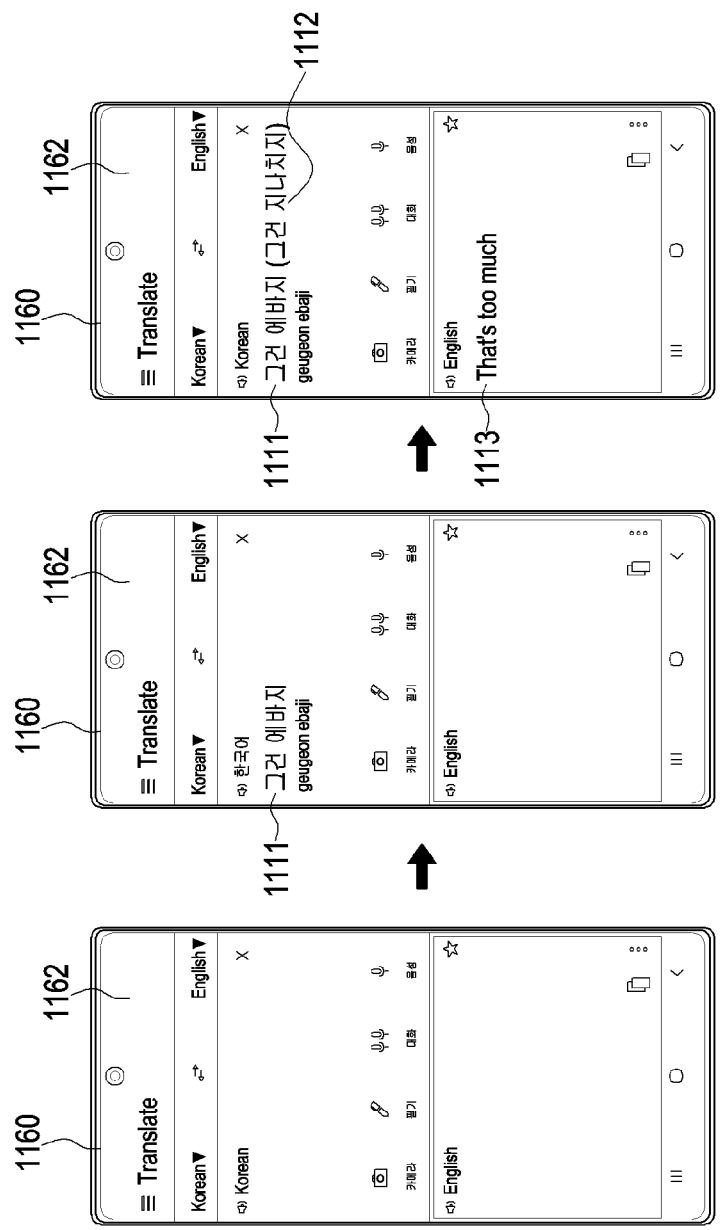
FIG. 11 is a diagram illustrating a screen when a translation function is performed using newly coined word-based sentence conversion in an electronic device according to an embodiment.

FIG. 11 is a diagram illustrating a screen when a translation function is performed using newly coined word-based sentence conversion in an electronic device according to an embodiment.

An electronic device according to an embodiment (e.g., the electronic device 101 of FIG. 1 or the electronic device 201 of FIG. 2) may display a translation application screen 1162 on a display 1160 if a translation application is executed.

According to an embodiment, the electronic device 101 may obtain a first sentence (e.g., "그건 지나치지") in the form of text, and may display the first sentence 1111 in a translation target area of the translation application screen 1162, and simultaneously, may transmit the same to an external device (e.g., the server 108 of FIG. 1 or the server 208 of FIG. 2).

According to an embodiment, if a third sentence 1112 (e.g., "그건 지나치지") obtained by replacing the first newly coined word (e.g., "에바지") included in the first sentence 1111 with a first alternative word (e.g., "지나치지"), and correcting a grammatical error is received, the electronic device 101 may display the third sentence in the translation target area and may display a translation 1113 (e.g., "That's too much") of the third sentence in a translation area.

According to an embodiment, if an existing word and a newly coined word are homonyms (e.g., if the first sentence is "savage!"), both the meaning of the newly coined word and the meaning of the existing word are displayed in the translation area.

According to various embodiments, if the translation function of the electronic device is used, a function that converts a newly coined word into an alternative word may enable the electronic device to translate even a sentence including a newly coined word.

Figure 12:
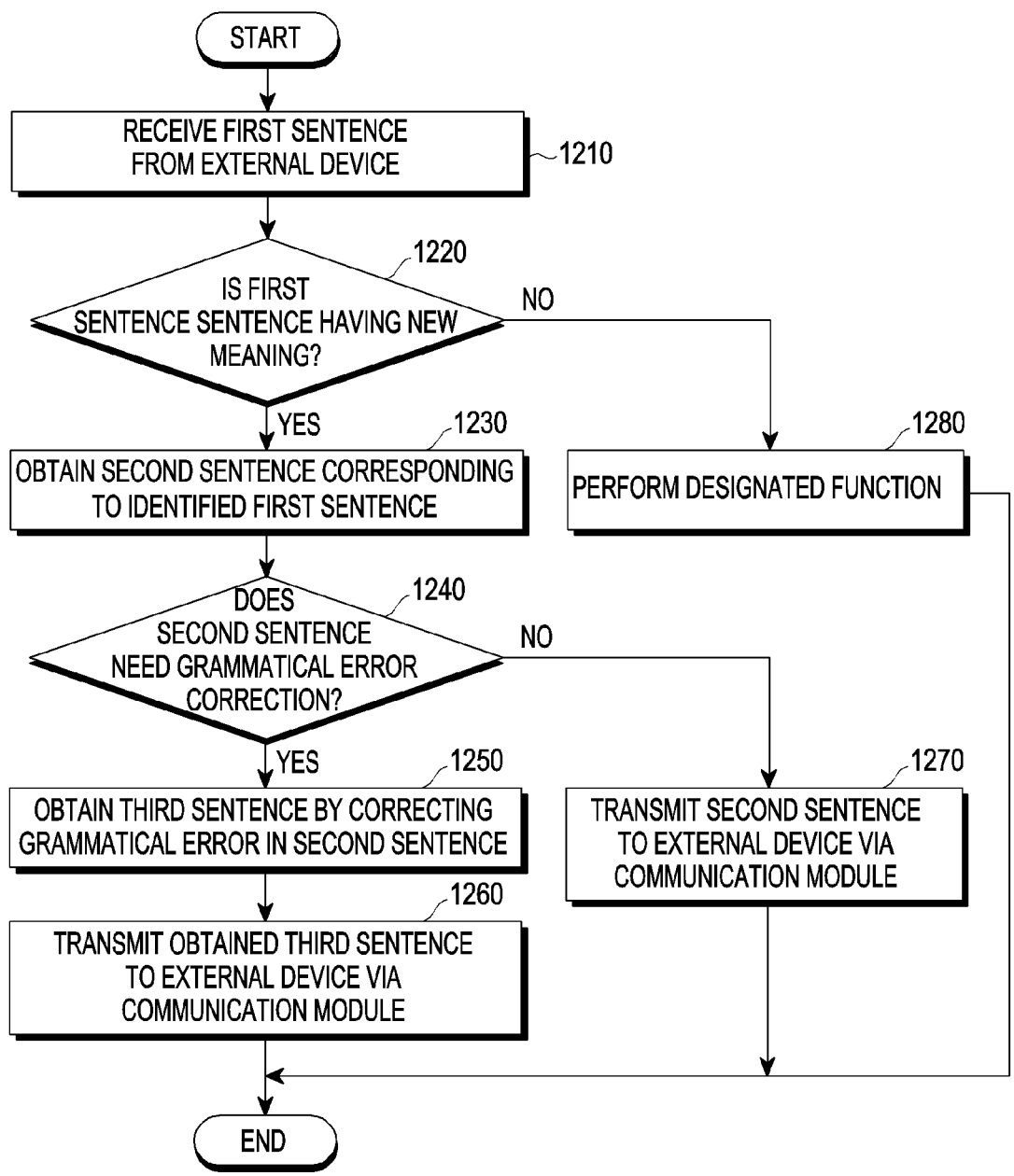
FIG. 12 is a diagram illustrating a process of performing newly coined word-based sentence conversion in an electronic device according to an embodiment.

FIG. 12 is a diagram illustrating a process of performing newly coined word-based sentence conversion in an electronic device according to an embodiment.

Referring to FIG. 12, a processor (e.g., the processor 220 of FIG. 2) of an electronic device (e.g., the server 108 of FIG. 1 or the server 208 of FIG. 2) according to an embodiment may perform at least one operation among operations 1210 to 1280.

In operation 1210, the processor 220 according to an embodiment may receive a first sentence (e.g., Wine O'clock) from an external device (e.g., the electronic device 101 of FIG. 1 or the electronic device 201 of FIG. 2).

In operation 1220, the processor 220 according to an embodiment may identify whether the first sentence is a sentence having a new meaning. For example, the processor 220 according to an embodiment may identify whether the first sentence is a sentence included in (i.e., stored in or registered with) a newly coined word database. According to an embodiment, in order to identify a newly coined word, the processor 220 may convert the first sentence into a first vector value, may compare the first vector value with a vector value set associated with a plurality of representative sentences, and may obtain a second vector value which is most similar to the first vector value from the vector value set. According to an embodiment, the processor 220 may identify a sentence group corresponding to a representative sentence corresponding to the second vector value. According to an embodiment, the processor 220 may identify a sentence meaning tagged to the sentence group, and may identify the meaning of the first sentence using the identified sentence meaning. According to an embodiment, the processor 220 may identify the meaning of the first sentence based on whether the meaning of the first sentence corresponds to the meaning of a sentence included in the newly coined word database 232.

In operation 1230, if the meaning of the first sentence is a sentence having a new meaning (Yes in operation 1220), the processor 220 according to an embodiment may obtain a second sentence (e.g., "It is the best time to drink wine") corresponding to the identified first sentence. The processor 220 according to an embodiment may produce a second sentence which semantically corresponds to the first sentence from train data according to a question and answer scheme using a machine reading comprehension (MRC) deep learning model, and may replace the first sentence with the second sentence. If the meaning of the first sentence is not a sentence having a new meaning (No in operation 1220), the processor 220 according to an embodiment may perform a designated function (e.g., translate the first sentence or execute a function indicated by the first sentence) in operation 1280.

In operation 1240, the processor 220 according to an embodiment may identify whether the second sentence needs grammatical error correction. In other words, the processor 220 according to an embodiment may identify whether the second sentence includes a grammatical error. The processor 220 according to an embodiment may identify whether the second sentence is a sentence having a grammatical error, based on information provided from at least one other module (e.g., the grammatical error producer 530 or the train data module 540).

If it is determined that the second sentence needs grammatical error correction in operation 1240, a third sentence may be obtained by correcting a grammatical error in the second sentence in operation 1250. The processor 220 according to an embodiment may learn data pairs including a grammatically erroneous sentence and a grammatically correct sentence using machine learning, and may correct a grammatically error in the second sentence based on a learning result, thereby obtaining the third sentence.

In operation 1260, the processor 220 according to an embodiment may transmit the obtained third sentence to the external device (e.g., the electronic device 101 of FIG. 1 or the electronic device 201 of FIG. 2) via a communication module.

If it is determined that the second sentence does not need grammatical error correction in operation 1240, the processor 220 may transmit the second sentence to the external device (e.g., the electronic device 101 of FIG. 1 or the electronic device 201 of FIG. 2) via the communication module in operation 1270.

According to various embodiments, operations 1210 to 1270 may be performed by the electronic device (e.g., the electronic device 101 of FIG. 1 or the electronic device 201 of FIG. 2).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, a non-transitory computer-readable recording medium stores instructions, and when the instructions are executed by at least one processor, the instructions cause the at least one processor to perform at least one operation. The at least one operation may include an operation of receiving a first sentence; an operation of identifying a first newly coined word that is present in the first sentence; an operation of obtaining a second sentence by identifying a first alternative word corresponding to the first newly coined word and replacing the first newly coined word in the first sentence with the first alternative word; an operation of obtaining a third sentence by correcting a grammatical error in the second sentence; and an operation of transmitting the third sentence to an external device.

Further, the embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of various embodiments of the disclosure should be construed to include, in addition to the embodiments disclosed herein, all changes and modifications derived on the basis of the technical idea of the disclosure.

According to various example embodiments of the disclosure, there is provided a method for outputting text by an electronic device in an artificial intelligence (AI) virtual assistance service, which recognizes the user's speech and interprets the intent to obtain a markup language for outputting text. The method may receive the user's utterance speech signal from an external device via a communication module or receive a speech signal, which is an analog signal, through a microphone, and convert the speech portion into readable text using an automatic speech recognition (ASR) model. The user's intent of utterance may be obtained by interpreting the text using a natural language understanding (NLU) model. The ASR model or NLU model may be an artificial intelligence model. The artificial intelligence model may be processed by an artificial intelligence-dedicated processor designed in a hardware structure specified for artificial intelligence model processing. The artificial intelligence (AI) model may be obtained via training. Here, "obtained via training" may refer, for example, to a pre-defined operation rule or artificial intelligence model configured to achieve a desired feature (or goal) being obtained by training a default artificial intelligence model with multiple pieces of training data using a training algorithm. The artificial intelligence model may include a plurality of neural network layers. Each of the plurality of neural network layers includes a plurality of weight values and performs neural network computation by computation between the result of computation by a previous layer and the plurality of weight values.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

Although the present disclosure has been described with various embodiments, various changes and modifications may be suggested to one skilled in the art. It is intended that the present disclosure encompass such changes and modifications as fall within the scope of the appended claims.

The invention claimed is:
1. An electronic device comprising:
a communication processor;
a memory; and
at least one processor operatively connected to the communication processor and the memory,
wherein the memory stores instructions configured to, when executed, enable the at least one processor to:
receive a first sentence via the communication processor;

identify a first newly coined word included in the first sentence;

obtain a second sentence by identifying a first alternative word corresponding to the first newly coined word and replacing the first newly coined word in the first sentence with the first alternative word;

identify a grammatical error in the second sentence based on replacing the first newly coined word in the first sentence with the first alternative word;

obtain a third sentence by correcting a grammatical error in the second sentence based on the first alternative word causing the grammatical error when replacing the first newly coined word; and transmit the third sentence to an external device via the communication processor.

2. The electronic device of claim 1, wherein:

the memory comprises a newly coined word database including words corresponding to newly coined words, and the instructions are further configured to, when executed, enable the at least one processor to:

identify whether at least one of the words corresponding to newly coined words is present in the first sentence using the newly coined word database; and in response to at least one of the words corresponding to newly coined words being included in the first sentence, identify the first newly coined word included in the first sentence.

3. The electronic device of claim 2, wherein the instructions are further configured to, when executed, enable the at least one processor to:

obtain the words corresponding to newly coined words from at least one designated Internet site; and store the obtained words corresponding to newly coined words in the newly coined word database.

4. The electronic device of claim 3, wherein the instructions are further configured to, when executed, enable the at least one processor to:

obtain sentences from the at least one designated Internet site;

identify sentence patterns based on words included in the obtained sentences; and in response to a first sentence pattern appears more than a predetermined number of times among the sentence patterns, and a word included in the first sentence pattern being not included in the newly coined word database, store the word included in the first sentence pattern in the newly coined word database as a word corresponding to a newly coined word.

5. The electronic device of claim 1, wherein the instructions are further configured to, when executed, enable the at least one processor to:

obtain a first vector value by performing vector conversion of the first sentence;

identify a meaning of the first sentence by comparing the first vector value with a plurality of vector values obtained by performing vector conversion of a plurality of sentences based on a meaning; and identify the first newly coined word and a meaning of the first newly coined word based on the identified meaning of the first sentence.

6. The electronic device of claim 5, wherein the instructions are further configured to, when executed, enable the at least one processor to:

obtain a plurality of sentences;

cluster the plurality of obtained sentences into groups;

obtain a plurality of sentence data sets by tagging a meaning for each of the plurality of clustered sentence groups; and obtain the plurality of vector values by performing vector conversion of each of the plurality of sentence data sets.

7. The electronic device of claim 1, wherein the instructions are further configured to, when executed, enable the at least one processor to identify the first alternative word corresponding to the first newly coined word based on a question and answer scheme using machine reading comprehension.

8. The electronic device of claim 1, wherein the instructions are further configured to, when executed, enable the at least one processor to:

learn data pairs including a grammatically erroneous sentence and a grammatically correct sentence using machine learning, and correct a grammatical error in the second sentence based on a result of the machine learning.

9. The electronic device of claim 8, wherein the instructions are further configured to, when executed, enable the at least one processor to:

produce and provide the grammatically erroneous sentence using a newly coined word and an alternative word, and learn the grammatically correct sentence which is grammatically corrected from the grammatically erroneous sentence.

10. An electronic device comprising:

an input module;

a display;

a communication processor;

a memory; and at least one processor operatively connected to the input module, the display, the communication processor, and the memory, wherein the memory stores instructions configured to, when executed, enable the at least one processor to:

obtain a first sentence from a signal input via the input module, and transmit the obtained first sentence to an external device via the communication processor;

receive, from the external device via the communication processor, a third sentence obtained by replacing a first newly coined word in the first sentence with a first alternative word and correcting a grammatical error identified in a second sentence based on replacing the first newly coined word in the first sentence with the first alternative word; and display a result of processing performed in association with the received third sentence on the display.

11. The electronic device of claim 10, wherein the instructions are configured to, when executed, enable the at least one processor to obtain the first sentence based on a touch input signal received via a touch screen of the input module or a voice signal received via a microphone of the input module.

12. The electronic device of claim 10, wherein the instructions are configured to, when executed, enable the at least one processor to:

obtain the first sentence after executing an application; and perform a function of the application based on the received third sentence.

13. A newly coined word-based sentence conversion method of an electronic device, the method comprising:
- receiving a first sentence;
- identifying a first newly coined word included in the first sentence;
- obtaining a second sentence by identifying a first alternative word corresponding to the first newly coined word and replacing the first newly coined word in the first sentence with the first alternative word;
- identify a grammatical error in the second sentence based on replacing the first newly coined word in the first sentence with the first alternative word; and
- obtaining a third sentence by correcting a grammatical error in the second sentence based on the first alternative word causing the grammatical error when replacing the first newly coined word.

14. The method of claim 13, comprising:
- obtaining words corresponding to newly coined words from at least one designated Internet site, and storing the words in a newly coined word database;
- identifying whether at least one of the words corresponding to newly coined words is included in the first sentence using the newly coined word database; and
- in response to at least one of the words corresponding to newly coined words being included in the first sentence, identifying the first newly coined word included in the first sentence.

15. A non-transitory computer-readable recording medium storing instructions which, when executed by at least one processor, cause at least one processor to perform at least one operation comprising:
- receiving a first sentence;
- identifying a first newly coined word included in the first sentence;
- obtaining a second sentence by identifying a first alternative word corresponding to the first newly coined word and replacing the first newly coined word in the first sentence with the first alternative word;
- identifying a grammatical error in the second sentence based on replacing the first newly coined word in the first sentence with the first alternative word;
- obtaining a third sentence by correcting a grammatical error in the second sentence based on the first alternative word causing the grammatical error when replacing the first newly coined word; and
- transmitting the third sentence to an external device.

* * * * *